United States Patent
Biskup

(10) Patent No.: US 9,229,889 B2
(45) Date of Patent: Jan. 5, 2016

(54) DUAL VOLTAGE COMMUNICATION BUS

(71) Applicant: Atieva, Inc., Redwood City, CA (US)

(72) Inventor: Richard J. Biskup, Redwood City, CA (US)

(73) Assignee: Atieva, Inc., Menlo Park, CA (US)

( * ) Notice: Subject to any disclaimer, the term of this patent is extended or adjusted under 35 U.S.C. 154(b) by 278 days.

(21) Appl. No.: 13/801,894

(22) Filed: Mar. 13, 2013

(65) Prior Publication Data

US 2014/0281077 A1    Sep. 18, 2014

(51) Int. Cl.
*G06F 13/00* (2006.01)
*G06F 13/20* (2006.01)

(52) U.S. Cl.
CPC .................................. *G06F 13/20* (2013.01)

(58) Field of Classification Search
CPC . H03K 3/012; H03K 3/289; H03K 3/356139; H03K 3/2885; G06F 13/20
USPC ........................................................ 710/110
See application file for complete search history.

(56) References Cited

U.S. PATENT DOCUMENTS

| | | | |
|---|---|---|---|
| 4,456,965 A | 6/1984 | Graber et al. | |
| 5,278,957 A * | 1/1994 | Chan | 710/107 |
| 6,697,897 B1* | 2/2004 | Friel et al. | 710/105 |
| 6,944,695 B1 | 9/2005 | Tangen | |
| 7,164,292 B2* | 1/2007 | Schmitt et al. | 326/86 |
| 7,359,433 B1* | 4/2008 | Culca | 375/220 |
| 7,417,464 B2* | 8/2008 | Crawford | 326/89 |
| 7,649,383 B2 | 1/2010 | Kobayashi et al. | |
| 7,746,114 B2 | 6/2010 | Nagase | |
| 7,793,005 B1* | 9/2010 | Fernald et al. | 710/3 |
| 7,893,717 B1 | 2/2011 | Meany et al. | |
| 8,231,996 B2 | 7/2012 | Howard et al. | |
| 8,354,186 B2 | 1/2013 | Muis | |
| 8,487,689 B2 | 7/2013 | Floyd | |
| 8,586,230 B2 | 11/2013 | Kim et al. | |
| 8,698,543 B1* | 4/2014 | Dribinsky | 327/333 |

(Continued)

FOREIGN PATENT DOCUMENTS

| | | |
|---|---|---|
| KR | 1020010062420 | 7/2001 |
| KR | 1020120055241 | 5/2012 |
| WO | WO 0139515 | 5/2001 |

OTHER PUBLICATIONS

"The I2C-Bus Specification", Jan. 2000, Philips, Version 2.1, p. 10.*

(Continued)

*Primary Examiner* — Faisal M Zaman
(74) *Attorney, Agent, or Firm* — Womble Carlyle Sandridge & Rice LLP

(57) ABSTRACT

A bidirectional bus system that includes a bus master having a first transmitter coupled to a bidirectional bus. The first transmitter transmits a signal in a first voltage range onto the bus. The bus master has a first receiver coupled to the bus. A bus slave having a second transmitter coupled to the bus is included. The second transmitter transmits a signal in a second voltage range onto the bus, where the bus slave having a second receiver is coupled to the bus. The first receiver is configured to interpret the signal in the first voltage range to indicate an idle state while the second receiver interprets the signal in the first voltage range as indicating data. The second receiver interprets the signal in the second voltage range as indicative of an idle state while the first receiver interprets the signal in the second voltage range as indicating data.

19 Claims, 4 Drawing Sheets

(56) References Cited

U.S. PATENT DOCUMENTS

| | | |
|---|---|---|
| 8,719,477 B2 | 5/2014 | Kaneko |
| 8,766,221 B1 * | 7/2014 | Chapuis .................. 250/551 |
| 8,868,807 B2 | 10/2014 | Kashima |
| 2004/0225814 A1 | 11/2004 | Ervin |
| 2006/0075170 A1 * | 4/2006 | Behrendt et al. ............. 710/110 |
| 2006/0203834 A1 * | 9/2006 | Augustinus .................. 370/419 |
| 2007/0236275 A1 * | 10/2007 | Smeloy et al. ................ 327/530 |
| 2008/0195783 A1 | 8/2008 | Deshpande |
| 2008/0270654 A1 | 10/2008 | Reberga |
| 2009/0031065 A1 * | 1/2009 | Travers et al. ................ 710/110 |
| 2010/0066409 A1 * | 3/2010 | Rodriguez et al. ............ 326/62 |
| 2011/0093739 A1 * | 4/2011 | Bernon-Enjalbert et al. . 714/4.5 |
| 2011/0122978 A1 * | 5/2011 | Peichel et al. ................ 375/354 |
| 2012/0025870 A1 * | 2/2012 | Ng et al. ........................ 326/63 |
| 2012/0275527 A1 | 11/2012 | Douglass |
| 2012/0287688 A1 | 11/2012 | Fornage et al. |
| 2013/0052514 A1 | 2/2013 | Kim |

OTHER PUBLICATIONS

International Search Report, PCT/US2014/025560, mailed Jun. 26, 2014.

International Search Report, PCT/US2014/025515, mailed Jul. 8, 2014.

International Search Report, PCT/US2014/024861, mailed Sep. 18, 2014.

International Search Report, PCT/US2014/022807, mailed Jul. 3, 2014.

* cited by examiner

DUAL VOLTAGE COMMUNICATION BUS

BACKGROUND

Communication buses are many and varied, as exemplified in computer backplanes, board buses, buses inside integrated circuits, bus standards, local area networks, wide area networks, and ad hoc and proprietary buses connecting devices. One bus in widespread use is the CAN (controller area network) bus, originally developed for vehicles. The CAN bus is a multi-master broadcast serial bus, which may be implemented using balanced pair signals in twisted-pair wires, optionally in shielded cables. Other buses may employ differential line drivers and differential receivers. Many buses support two states, "1" and "0", or three states, "1", "0" and "Z" or high impedance. Yet, components for many of these buses may be more expensive than desired, have complex protocols, or may not function well in harsh environments such as the operating environment for automobiles.

It is within this context that the embodiments arise.

SUMMARY

A bidirectional bus system and related method are disclosed.

In one embodiment, a bidirectional bus system is provided. The bidirectional bus includes a bus master having a first transmitter configured to couple to a bidirectional bus. The first transmitter is operable to transmit a signal in a first voltage range onto the bidirectional bus, wherein the bus master having a first receiver configured to couple to the bidirectional bus. A bus slave having a second transmitter configured to couple to the bidirectional bus is included. The second transmitter is operable to transmit a signal in a second voltage range onto the bidirectional bus, where the bus slave having a second receiver is configured to couple to the bidirectional bus. The first receiver is configured to interpret the signal in the first voltage range as indicative of an idle state while the second receiver interprets the signal in the first voltage range as communicative of data. The second receiver is configured to interpret the signal in the second voltage range as indicative of an idle state while the first receiver interprets the signal in the second voltage range as communicative of data.

In another embodiment, a bidirectional bus system is provided. The bidirectional bus system includes a bus master having a first differential output circuit configured to couple to a bidirectional bus and to express differential voltages in a first voltage range on the bidirectional bus during master transmission. The bus master has a first differential input amplifier configured to couple to the bidirectional bus, where the first differential input amplifier is configured to receive the differential voltages in the first voltage range as showing a single logic value. The first differential input amplifier is configured to receive differential voltages in a second voltage range as showing an active communication that includes two logic values. A bus slave having a second differential output circuit configured to couple to the bidirectional bus and to express the differential voltages in the second voltage range on the bidirectional bus during slave transmission is included. The bus slave has a second differential input amplifier configured to couple to the bidirectional bus. The second differential input amplifier is configured to receive the differential voltages in the first voltage range as showing a further active communication that includes the two logic values. The second differential amplifier is configured to receive the differential voltages in the second voltage range as showing the single logic value.

In another embodiment, a method of operating a bidirectional bus is provided. The method includes transmitting onto a bidirectional bus a first sequence of voltages that includes a voltage in a first voltage range and a voltage in a second voltage range and interpreting the first sequence of voltages, at a first location, as a single logic value associated with an idle state. The method includes interpreting the first sequence of voltages, at a second location, as a first active communication having application of two logic values and transmitting onto the bidirectional bus a second sequence of voltages that includes a further voltage in the second voltage range and a voltage in a third voltage range. The method further includes interpreting the second sequence of voltages, at the first location, as a second active communication having application of the two logic values and interpreting the second sequence of voltages, at the second location, as the single logic value associated with the idle state.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As shown in FIGS. 1-6, embodiments of the dual voltage communication bus have a two wire bus that is bidirectional, and various components that transmit and receive differential voltages on the bus. Twisted pairs, shielded pairs, shielded twisted pairs, etc., can be used in the wiring of the bus. The bus can be used to connect a master and one or more slaves in some embodiments. This application is related to U.S. application Ser. Nos. 13/794,535, 13/801,913, and 13/801,936 each of which is incorporated herein by reference for all purposes.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
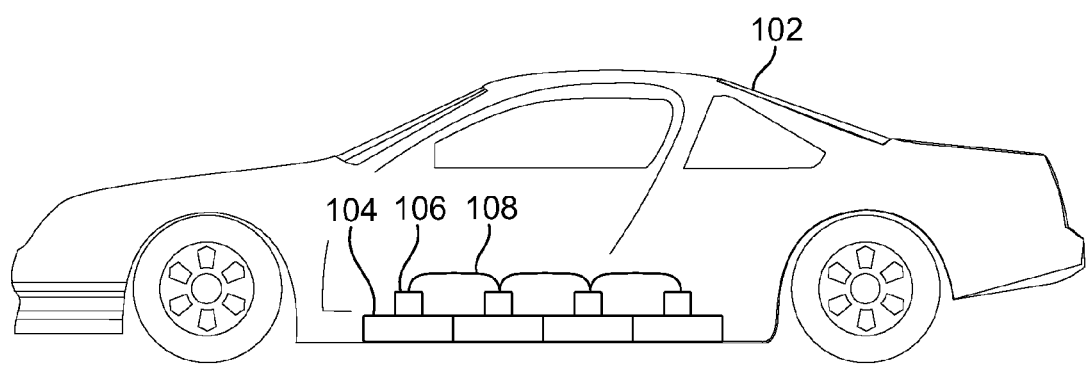
FIG. 1 is a schematic diagram of a communication bus connecting sensors on battery modules in an automobile in accordance with some embodiments.

FIG. 1 shows rechargeable battery application for a communication bus system in accordance with some embodiments. An automobile 102, which could be a hybrid or an electric car, has battery modules 104. On top of the battery modules 104, there are sensor modules 106, which monitor battery conditions, such as temperature and voltage. A communication bus 108 connects the sensor modules 106. The sensor modules 106 can track battery charging, discharging, lifespan, faults or other error or environmental conditions, and communicate these amongst themselves. Low-cost and operation under a variety of conditions, such as temperature, humidity, vibration, acceleration, deceleration, aging, etc., are desirable. The battery modules 104 may be connected in various parallel and serial arrangements, and have differing operating voltages, e.g., successively stacked serial modules with voltages up to 400 volts or more. Over time, components and connectors can age, a wire can break, component values and drive strengths can change, battery cells can go open circuit or short-circuit, and other fault conditions can arise. Signal noise can arise on the communication bus 108 from electromagnetic coupling of the bus to the wiring connecting the battery cells and the large surge currents of up to hundreds of amps in this wiring. Other industrial, commercial and consumer applications may have related or additional concerns and conditions, which a well-designed communication bus system may address. It should be appreciated that while automobile 102 is illustrated in this example, this is not meant to be limiting as any land, sea, or air based vehicle may integrate the bus design described herein.

Figure 2:
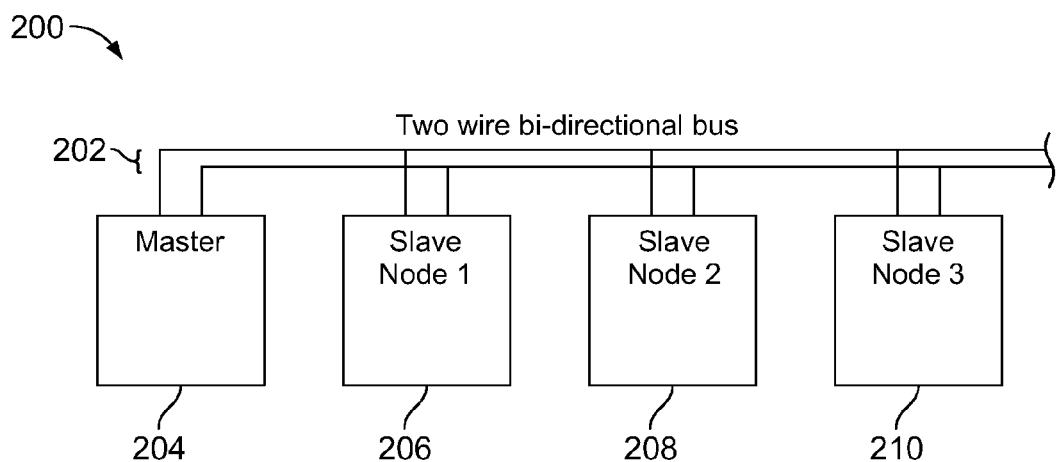
FIG. 2 is a schematic diagram of a bus master and bus slaves connected by a communication bus, in accordance with some embodiments.

FIG. 2 shows a communication bus system 200 in accordance with some embodiments. Communication bus system 200 includes a two-wire bidirectional bus 202, a bus master 204, and bus slave nodes 206, 208, 210. The communication bus system 200 is suitable for the automotive battery application shown in FIG. 1, among other types of systems. The two-wire bidirectional bus 202 can be implemented as shown, with paired wires, shielded cable, shielded pairs, twisted pairs, or twisted pairs in shielded cable and other variations as readily devised. The two-wire bidirectional bus 202 supports differential voltages, as will be further described. A far end of the two-wire bidirectional bus 202 is shown as extendable. The total number of bus masters and bus slaves that can be coupled to the two-wire bidirectional bus 202 is dependent upon various factors such as capacitive loading, drive strength of the components, termination, length and impedance of the wiring, and signal timing. It should be appreciated that bus master 204 may be a controller, such as a microprocessor or programmable logic device, while slave nodes may be sensors in some embodiments.

Figure 3:
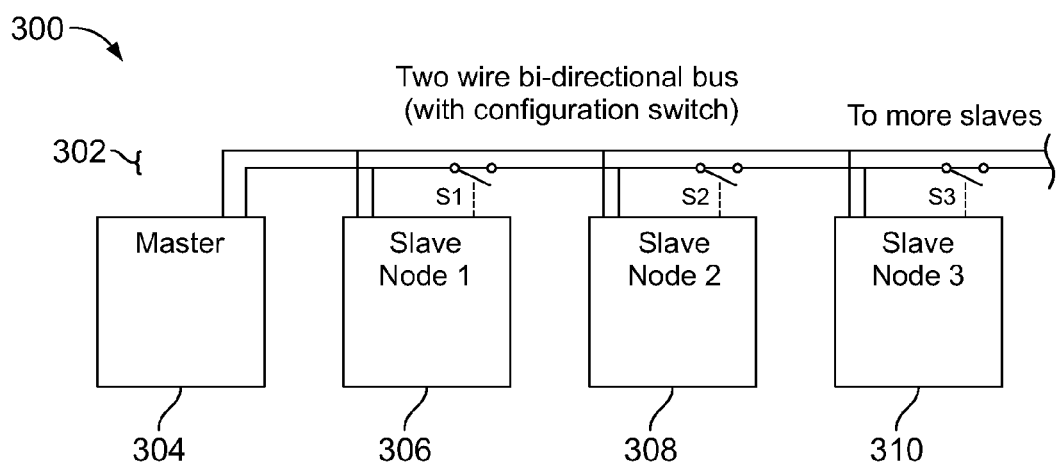
FIG. 3 is a schematic diagram of a bus master and bus slaves connected by a communication bus with switches in accordance with some embodiments.

FIG. 3 shows a communication bus system 200 having switches that provide galvanic isolation of slave nodes in accordance with some embodiments. A two-wire bidirectional bus 202 connects a bus master 204 and bus slave nodes 206, 208, 210. At each slave node, a switch S1, S2, S3 can activate to close or open to connect or disconnect the respective slave node along one of the wires of the two-wire bidirectional bus. Opening the switch S1 leaves a first bus slave node 206 coupled to the bus master 204 via the two-wire bidirectional bus 202, but disconnects downstream slave nodes, e.g., a second slave node 208 and a third slave node 210, etc., so that the downstream slave nodes 208 and 210, no longer communicate with the bus master 204. Similarly, opening the switch S2 leaves the second bus slave node 208 connected to the bus master 204 if the first switch S1 is closed, but disconnects downstream slaves, e.g., the third slave node 210, etc., so that the downstream slave nodes no longer communicate with the bus master 204. These actions and conditions can be repeated for further downstream slaves. The two-wire bidirectional bus 202 supports differential voltages. The switches S1, S2, S3 could be implemented using transistors of various types, or relays or other circuitry.

Figure 4:
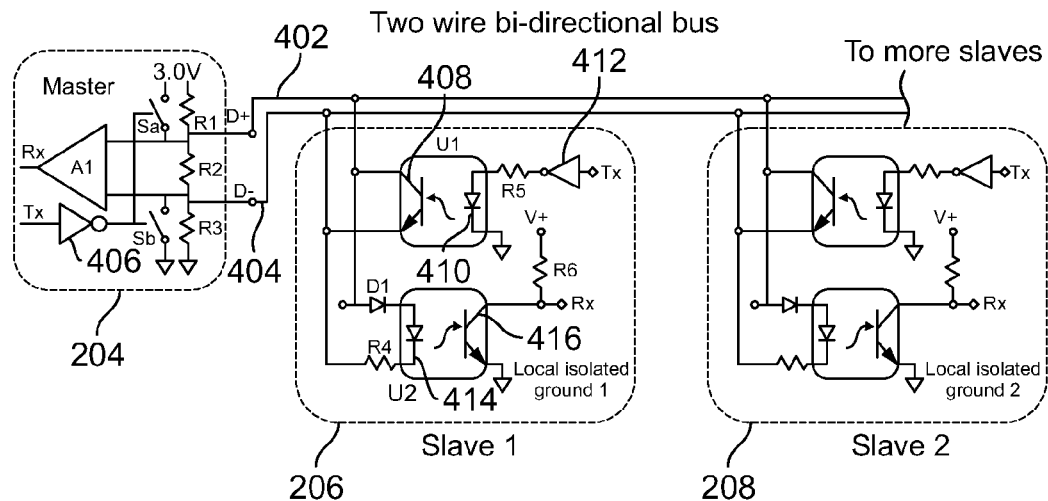
FIG. 4 is a schematic diagram of electronic circuitry in the bus master and bus slaves in accordance with some embodiments.

FIG. 4 shows an embodiment of electronic circuitry inside of the bus master 204 and the bus slave nodes 206, 208. A resistor ladder biases the two-wire bidirectional bus to a specified differential voltage, i.e., establishes the specified differential voltage on the bus, in the absence of driving by any transmitter onto the bus. In the embodiment shown, the resistor ladder establishes about 0.9 V on the bus at bus idle. The resistor ladder also provides a termination to the two-wire bidirectional bus, establishing a termination impedance of the bus. The resistor ladder has a first resistor R1 connected between a power supply voltage and the first wire 402 of the bidirectional bus, a second resistor R2 connected between the first wire 402 and the second wire 404 of the bidirectional bus, and a third resistor R3 connected between the second wire 404 and electrical ground, which may be a local ground terminal, for example, local to the bus master 204, or a system ground. In the embodiment shown, the resistor ladder is included in or otherwise associated with the bus master 204. However, the resistor ladder could be located elsewhere along the two-wire bidirectional bus in variations. Resistance for the resistors R1-R3 in the resistor ladder can be set at relatively low values for a low impedance bus, or higher for decreased drive strength requirements placed on the bus master 204 and the bus slave nodes 206 and 208. A low impedance bus, i.e., with low resistance values on the resistor ladder, generally supports higher frequency communication and greater noise immunity. One reason for the greater noise immunity is that a given current spike, from cross coupling, produces a lower voltage spike across a lower resistance value. A low impedance bus and small capacitive loading for each bus slave node added to the bus generally supports a higher number of bus slave nodes before signal rise and fall times degrade. In one example, the resistors in the resistor ladder each have about 300 to 360 ohms and the bus supports 100 kbps (kilobits per second) data rate serial communication.

Still referring to FIG. 4, a differential amplifier A1 is employed inside the bus master 204, to receive differential voltages from the two wires 402, 404 of the bidirectional bus. It should be appreciated that the term "wires" may be interchanged with the term "leads." The differential amplifier A1 is tuned to recognize a first specified differential voltage range as a logical zero, and a second specified differential voltage range as a logical one, and output these logical values on the Rx terminal of the differential amplifier A1. Various types of known differential amplifiers can be used with the embodiments described herein. An output terminal Rx of the differential amplifier A1 can be connected to the receiver input of a UART (universal asynchronous receiver transmitter), for the bus master 204. In the embodiment shown, the resistor ladder has resistor values selected to establish a specified differential voltage on the two-wire bidirectional bus that is received by the differential amplifier A1 as a logical one. In turn, the logical one is passed along to the receiver input of the UART, which interprets a logical one as an idle state or mark, in the absence of timed transitions to and from the logical zero state (which would indicate data transmission). The receive path of the bus master 204 thus receives differential voltages, as established by the resistor ladder, or transmitted by one of the bus slaves, and converts these differential voltages to logical zeros or ones via the differential amplifier A1, and expresses the logical zeros and logical ones on the Rx terminal.

Continuing with FIG. 4, inside the bus master 204, the transmit path takes logical zeros and logical ones from a Tx terminal, which may come from the transmitter output of the above-discussed UART and expresses them as differential voltages on the two wires 402, 404 of the bidirectional bus. The Tx terminal is configured to buffer the logical zeros and logical ones through a buffer 406, which can be an inverter as shown, and operating two switches Sa, Sb. The first switch Sa is connected between the power supply voltage and the first wire 402 of the bidirectional bus, and the second switch Sb is connected between the second wire 404 of the bidirectional bus and the ground terminal, which may be a local ground. In the version shown, a logical one arriving on the Tx input of the transmit path of the bus master 204 opens the switches Sa, Sb so that the bias value of the resistor ladder R1, R2, R3 is expressed as a differential voltage value on the two wires 402, 404 of the bidirectional bus. A logical zero arriving on the Tx input of the transmit path of the bus master 204 closes the switches Sa, Sb so that the full voltage spread from ground to the power supply voltage is expressed as a differential voltage value on the two wires 402, 404 of the bidirectional bus. The switches Sa, Sb can be implemented using transistors of various types, or relays or other circuitry. Control circuitry suitable for the polarity of the buffer 406 and the specifications of the switches Sa, Sb can be added in some embodiments. In variations, other values of differential voltage could be expressed for logical zeros or logical ones, other types of drivers could be used, or the switches could be replaced by three state buffers, and the circuitry can be devised or adjusted for these changes.

Continuing with FIG. 4, the transmit path of the bus slave 206 makes use of a switch 408 coupled across the two wires 402, 404 of the bidirectional bus. In this embodiment, when the switch 408 is open, the differential voltage on the bus remains at the bias value established by the resistor ladder. When the switch 408 is closed, the two wires 402, 404 of the bus are essentially shorted together by the switch 408 and the differential voltage value on the bus is close to 0 V (zero volts). In the version shown, the switch 408 is part of an optoisolator U1, and is implemented using a phototransistor. An optoisolator, also known as an optical isolator, generally includes an LED (light emitting diode) coupled optically to a phototransistor. A logical zero appearing on the Tx terminal of the bus slave 206 is inverted by an inverter 412, which provides a voltage across the resistor R5 and a current through the resistor R5 and through the LED 410. Photons from the LED 410 cause the phototransistor to turn on, which operate to close the switch 408. A logical zero in the transmit path of the bus slave 206 is thus expressed as an approximately 0 V differential voltage on the bidirectional bus. For example, one type of photo transistor has a nominal 5 mA sink capability when switched on, and the resistor ladder can have resistance values adjusted so that the phototransistor can sufficiently pull together the two wires 402 and 404 of the two wire bi-directional bus. A logical one in the transmit path of the bus slave node 206 is expressed as open or high impedance from the switch 408, so that the bias differential voltage value from the resistor ladder predominates (unless another transmitter is sending). In variations, other values of differential voltage could be expressed for logical zeros or logical ones, and other types of drivers or switches could be used, such as those discussed with regard to the bus master.

Still referring to FIG. 4, the receive path of the bus slave 206 has a differential amplifier U2 connected across the first wire 402 and the second wire 404 of the bidirectional bus. In the version shown, the differential amplifier U2 is implemented using an optoisolator, which has an LED 414 and a phototransistor 416. The LED 414 may produce photons in the infrared range, in a visual range, or an ultraviolet range, etc., and the phototransistor should be selected or matched to respond to the photons in the respective range. The optoisolator acts as a differential amplifier in the sense that the output of the optoisolator responds to various differential voltages as seen on the bidirectional bus. A diode D1 is connected between the first wire 402 of the bidirectional bus and the anode (positive) terminal of the LED 414, which effectively raises the turn on threshold of the circuit to two diode drops. A resistor R4 connected between the cathode (negative) terminal of the LED 414 and the second wire 404 of the bidirectional bus acts as a current-limiting resistor for the two diodes D1, 414 in series. A differential voltage of less than two diode drops on the bidirectional bus results in the LED 414 being off, no photons being generated by the LED 414, and the phototransistor 416 being in an off state. A resistor R6 connected to a local power supply voltage and in series with the phototransistor 416 has a receiver output terminal Rx at the junction between the resistor R6 and the phototransistor 416. When the phototransistor 416 is off, the receiver terminal Rx of the bus slave 206 shows a logical one, i.e., is close to the local power supply voltage. A differential voltage of greater than two diode drops on the bidirectional bus results in the LED 414 turning on, and photons being generated by the LED 414, which turns the phototransistor 416 to an on state. With sufficient current passing through the phototransistor 416, and depending on the value selected for the resistor R6, the receiver terminal Rx of the bus slave 206 shows a logical zero. Other types of differential amplifiers or other types of input circuits can be used in variations of the bus slave 206, as can different tunings for various differential voltages and logical values. For example, a differential amplifier with hysteresis could be used, as could MOSFETs, bipolar transistors, relays, common power supply and ground connections, other types or levels of biasing or polarity and so on. The use of optoisolators U1, U2 allows the bus slave 206 to have local ground and local power supply independent of the ground and power supply in the bus master 204. This is useful when the slave node 206 is applied to monitoring circuitry for battery cells that are connected in series, where DC (direct current) voltages can develop that may be slightly or greatly in excess of the power supply voltages of the master 204 or of other slave nodes. The second slave node 208 and other slave nodes can use identical circuitry, or can use variations in circuitry. Other types of isolation devices such as transformers or level shifting circuitry can be used in variations of the slave node 206.

Figure 5:
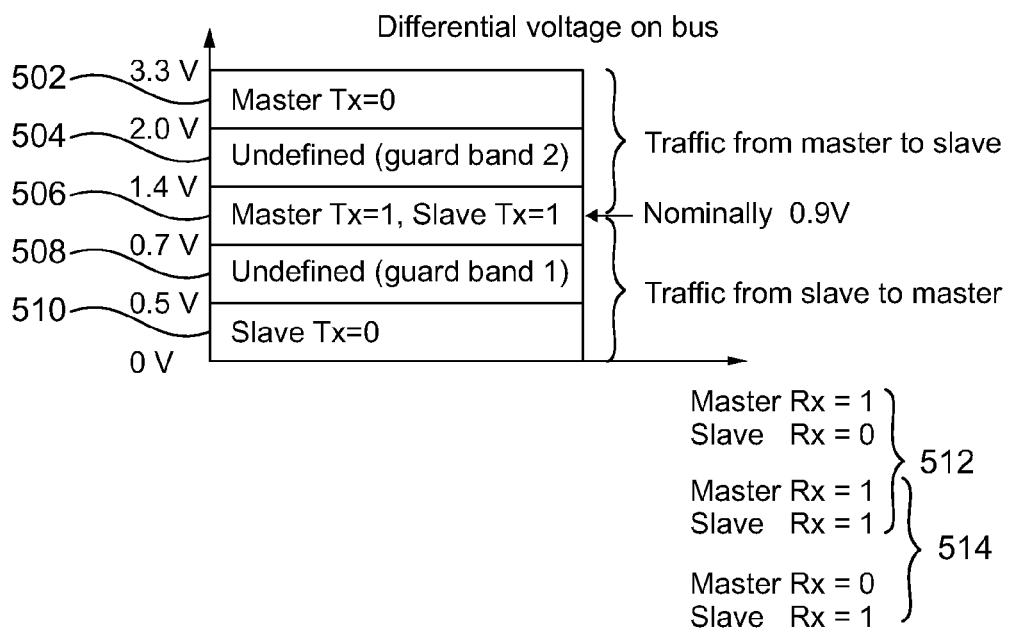
FIG. 5 is a voltage diagram of differential voltage levels, as applicable to the communication bus in accordance with some embodiments.

FIG. 5 is a diagram showing differential voltage levels as seen on the two-wire bidirectional bus of FIGS. 1-4. As generally understood, a differential voltage is said to be zero when the voltage on the first wire 402 (which may also be called D+ or V+) is approximately equal to the voltage on the second wire 404 (which may also be called D− or V−). The differential voltage is said to be greater than zero when the voltage on the first wire 402 is greater than the voltage on the second wire 404. Absolute voltage on the first wire 402 or the second wire 404 can be compared to a reference voltage, such as a ground voltage which may be local or global. The differential voltage values shown are selected for a specified embodiment, and can be adjusted, or used as relative or absolute voltage values, for further embodiments.

Voltages in a first voltage range 512 are transmitted from a bus master to one or more bus slaves. The first voltage range 512 includes a first voltage sub range 502 and a second voltage sub range 506. Voltages in a second voltage range 514 are transmitted from a bus slave to the bus master. The second voltage range 514 includes the second voltage sub range 506 and a third voltage sub range 510. That is, the first voltage range 512 and the second voltage range 514 overlap. The overlap of the first voltage range 512 and the second voltage range 514 includes the second voltage sub range 506. Both the first voltage sub range 502 and the third voltage sub range 510 are arranged outside of this overlap.

The first voltage sub range 502 is for a differential voltage value of between 3.3 V and 2.0 V, inclusive. The first voltage sub range 502 is expressed as a differential voltage on the bidirectional bus when the bus master is transmitting a logical zero. The first voltage sub range 502 is received by a bus master receiver as a logical one, and received by a bus slave receiver as a logical zero. The second voltage sub range 506 is for a differential voltage value of between 1.4 V and 0.7 V, inclusive. The second voltage sub range 506 is expressed as a differential voltage on the bus when the master is transmitting a logical one, a slave is transmitting a logical one, or neither a master nor a slave is transmitting, i.e., the bus is idle. The second voltage sub range 506 is received by a bus master receiver as a logical one, and received by a bus slave receiver as a logical one. The third voltage sub range 510 is for a differential voltage value of between 0.5 V and 0 V, inclusive. The third voltage sub range 510 is expressed as a differential voltage on the bus when a slave is transmitting a logical zero. The third voltage sub range 510 is received by a bus master receiver as a logical zero, and received by a bus slave receiver as a logical one. In further embodiments, the voltage levels shown in FIG. 5 could be absolute voltages, or relative voltages, applied to a two-wire bidirectional bus with one of the wires being ground or other reference voltage and the other of the wires being a signaling wire. Voltage polarities could be reversed for one of the voltage ranges, or equivalently the differential voltage could be a negative voltage for one of the voltage ranges.

Although other differential voltage value assignments and logical value assignments can be made and operated successfully on the two-wire bidirectional bus, the differential voltage values and logic value assignments shown herein have powerful properties in the communication of the bus system described herein. For example, serial communication can readily be used in the bus system, with the bus master having a UART and each of the slave nodes having a respective UART. When none of the UARTs is transmitting data, all of the UARTs are sending out an idle or mark state, which is a logical one. This is expressed as a voltage in the second voltage sub range 506, which is received by the master receiver as a logical one and received by the slave receiver as a logical one. All of the UARTs will be looking for a logical zero start bit, during this idle state. When the bus master starts transmitting, the bus master sends the start bit as a logical zero expressed as a voltage in the first voltage sub range 502 on the bus, which is received by the bus master receiver as a logical one and is received by the receivers of the respective slave nodes as a logical zero. The bus master receiver is thus not disturbed by bus master transmission as the bus master does not see its own transmissions and the bus master does not monitor the bus for bus slave traffic while the bus master is transmitting in some embodiments. It should be appreciated that the transmission from the bus master overpowers any transmission from a bus slave in some embodiments. All of the bus slave nodes (unless disconnected from the bus) receive or see the first voltage sub range 502 as a logical zero or start bit, and begin receiving serial data from the bus master. The bus master is enabled transmit to all of the slaves, but not bother receiving the bus master's own transmission. Logical zeros and logical ones sent by the bus master are experienced by the bus master receiver as all being logical ones, keeping the bus master receiver in the idle state.

In the reverse direction, when a bus slave node starts transmitting, the bus slave node sends the start bit as a logical zero expressed as a voltage in the third voltage sub range 510 on the bus, which is received by the receivers of respective bus slave nodes as a logical one and is received by the bus master receiver as a logical zero. The receivers of the bus slave nodes are thus not disturbed by a bus slave node transmission, and can continue to look for data being sent by the bus master. The bus master (unless disconnected from a bus slave that is transmitting) receives or sees the third voltage sub range 510 as a logical zero or start bit, and begins receiving serial data from the bus slave node. The bus slave node can thus transmit to the bus master, but not bother receiving the bus slave's own transmission. Other bus slave nodes also do not bother receiving the transmission from the bus slave node. Logical zeros and logical ones sent by the bus slave node are experienced by the bus slave receivers as all being logical ones, keeping the bus slave receivers in the idle state. With this arrangement of bus values, the bus master can broadcast to all of the bus slave nodes, i.e., operate in broadcast mode, and a single slave node can communicate back to the bus master in response. Communication processing is minimized, as the bus master receiver does not have to look at transmissions by the bus master transmitter and the bus slave receivers do not have to look at transmissions by other bus slaves. It should be appreciated that this reduces processing overhead overall.

Selection of the first, second and third voltage sub ranges 502, 506, 510 can confer a directionality to the communications, as discussed above. When the first voltage sub range 502 is observed on the two-wire bidirectional bus, communication is from the bus master to the bus slave nodes. When the third voltage sub range 510 is observed on the two-wire bidirectional bus, communication is from a bus slave node to the bus master. In one embodiment, various component values are adjusted (i.e., components selected) so that the master can "win" the bus if a rogue slave node is communicating when it shouldn't be. For example, with reference to FIG. 4, the closed-switch impedances of the switches Sa, Sb of the bus master 204 can be selected at a value lower than the closed-switch impedance of the switch 408 of the bus slave 206, so that the bus master 204 can express a differential voltage within the first voltage sub range 502 on the bus even if a bus slave 206 is attempting to express a differential voltage within the third voltage sub range 510 on the bus.

The communication bus system described herein achieves a low-cost, bidirectional, half duplex operation over a two wire interface, with advantages provided by the various embodiments. The bus master, and each of the bus slaves nodes, acts as a transceiver for a commonly available UART as found with many microcontrollers. Optoisolators in the bus slave provide galvanic isolation. For example, each bus slave can be operated with a different local power supply such as by connecting to local battery cells, even when the battery cells are stacked in series. Further, if one of the bus slaves experiences a local power supply failure, such as a battery cell going dead, this does not disrupt communication between the bus master and the remaining bus slaves. Differential signaling provides high immunity to common mode noise. In addition, guard band 1 508 and guard band 2 504 are provided to offer a buffer for any noise in the system. It should be appreciated that the ranges for the guard bands 504 and 508, as well as the other voltage ranges of FIG. 5, are illustrative and not meant to be limiting as any suitable ranges may be selected to achieve the functionality described herein. The optoisolators also provide high immunity to common mode noise. Signaling voltages that are kept positive, i.e., no negative differential voltages, do not reverse bias the emitter-base junction of the phototransistor in the optoisolator U1 of the bus slave node. This avoids hot carrier injection, which is known to degrade the gain of a phototransistor. The circuits shown herein operate as a transceiver for commonly available UARTs. The circuits are relatively insensitive to bus loading, allowing stable performance as additional bus slaves are added to the bus.

Figure 6:
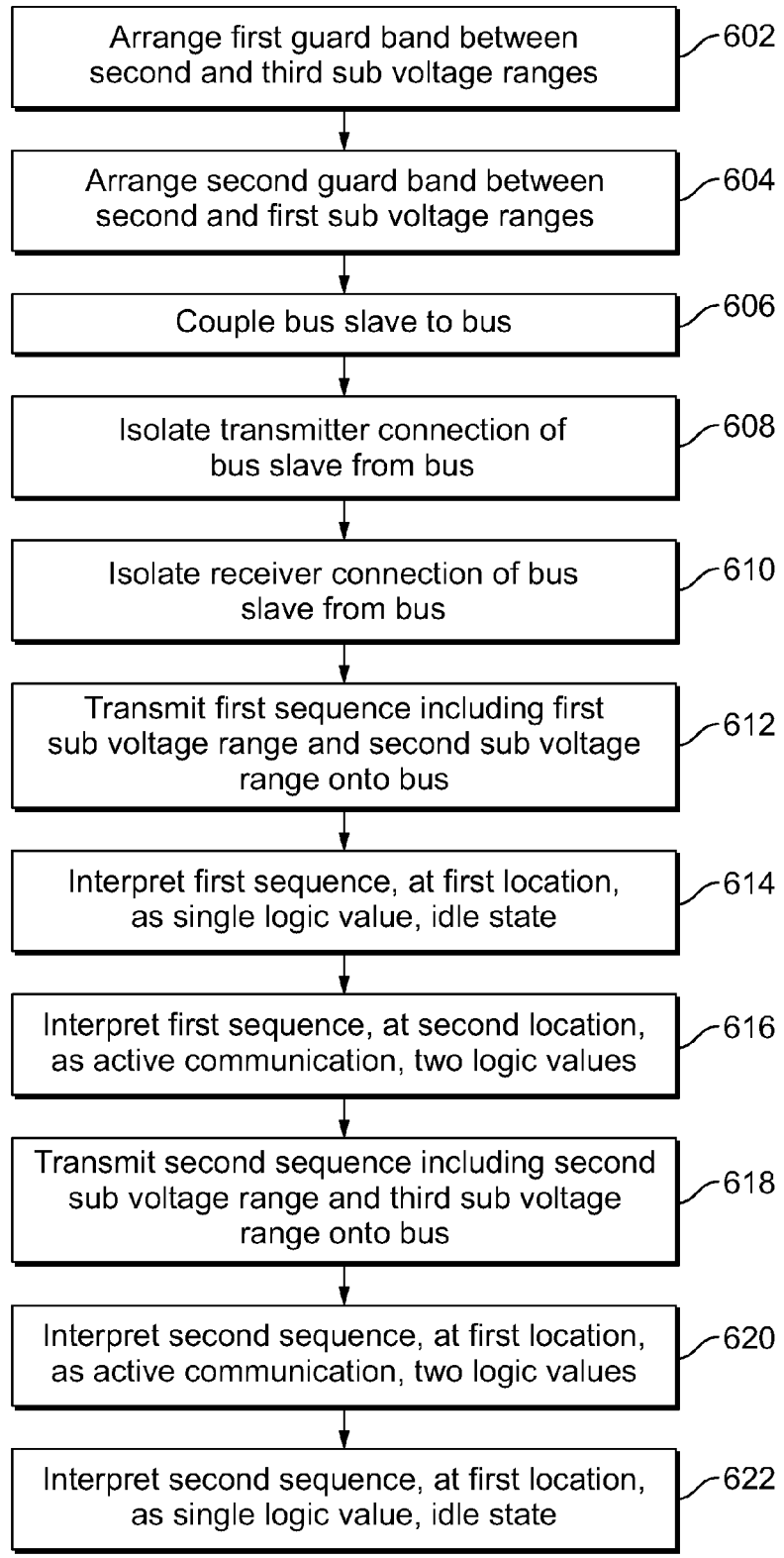
FIG. 6 is a flow diagram of a method of operating a communication bus in accordance with some embodiments.

FIG. 6 shows a method of operating a two-wire bidirectional bus. This method may be practiced using the communication bus system described herein with differential voltage values as shown in FIG. 5. The method as presented in this embodiment is compatible with the use of a UART in the bus master 204, and another UART in each of the bus slave nodes 206, 208 of FIG. 5. Variations on the method may be practiced with fewer or additional steps or the steps rearranged, or with various differential voltage values, or absolute or relative voltage values, and with various numbers of bus slaves. The method initiates with operation 602 where a first guard band is arranged between the second and third differential sub voltage ranges. The differential voltage levels and ranges shown in FIG. 5 are suitable candidates for this action. Circuit response to voltages in the second and third sub voltage ranges, and inclusion of the first guard band, can be arranged by adjusting the response of the differential amplifier A1 in the bus master 204 and/or adjusting the resistors R1, R2, R3 in the biasing circuit coupled to the two-wire bidirectional bus of FIG. 5 in some embodiments. A second guard band is arranged between the second and first sub voltage ranges, in operation 604. Circuit response to voltages in the second and third sub voltage ranges, and inclusion of the first guard band, may be arranged by adjusting resistors R6, R4 and/or by adding a diode D1 in the receiver section of the bus slave 206 of FIG. 5.

Continuing with FIG. 6, a bus slave is coupled to the bidirectional bus, in operation 606. It should be appreciated that any number of bus slaves can be used with the embodiments described herein. A transmitter connection of a bus slave is isolated from the bus, in an action 608. This can be accomplished using an optoisolator, as shown in FIG. 4, or other isolation device. A receiver connection of the bus slave is isolated from the bus, in operation 610. Similarly, this can be accomplished using an optoisolator or other isolation device. In operation 612, a first sequence of voltages is transmitted onto the bus. The first sequence of voltages includes a voltage in the first sub voltage range and a voltage in the second sub voltage range. For example, the first sequence could be a transmission from a bus master of a serial communication of binary bits from a UART coupled to the bus master, with the voltage in the first sub voltage range representing a logical zero and the voltage in the second sub voltage range representing a logical one, as illustrated in FIG. 5.

The first sequence of voltages is interpreted, at a first location along the bus, as a single logic value associated with an idle state, in an action 614. For example, the first location could be where the bus master is coupled to the bus. The receiver of the bus master interprets the voltage in the first sub voltage range as a logical one. Also, the receiver of the bus master interprets the voltage in the second sub voltage range as a logical one. Accordingly, the receiver sees this single logic value, and the UART coupled to the receiver of the bus master remains in the idle state. In operation 616, the first sequence is interpreted at a second location as an active communication having an application of two logic values. For example the second location along the bus could be where a bus slave is coupled to the bus. The receiver of the bus slave interprets the voltage in the first sub voltage range as a logical zero. Also, the receiver of the slave interprets the voltage in the second sub voltage range as a logical one. So, the receiver sees these two logic values as part of a sequence of ones and zeros, indicating an active communication of data, such as a message to be received by the UART coupled to the receiver of the bus slave.

In one action 618, a second sequence of voltages is transmitted onto the bus. The second sequence of voltages includes a voltage in the second sub voltage range and a voltage in the third sub voltage range as illustrate din FIG. 5. For example, the second sequence could be a second transmission from a bus slave of a serial communication of binary bits from a UART coupled to the bus slave, with the voltage in the second sub voltage range representing a logical one and the voltage in the third sub voltage range representing a logical zero. In operation 620, the second sequence is interpreted at the first location as an active communication having an application of two logic values. For example the first location could be where the bus master is coupled to the bus. The receiver of the bus master interprets the voltage in the second sub voltage range as a logical one. Also, the receiver of the bus master interprets the voltage in the third sub voltage range as a logical zero. So, the receiver sees these two logic values as part of a sequence of ones and zeros, indicating an active communication of data such as a message to be received by the UART coupled to the receiver of the bus master.

The second sequence of voltages is interpreted, at the second location, as a single logic value associated with an idle state, in an action 622. For example, the second location could be where the bus slave is coupled to the bus. The receiver of the bus slave interprets the voltage in the second sub voltage range as a logical one. The receiver of the bus slave also interprets the voltage in the third sub voltage range as a logical one. Thus, the receiver of the bus slave sees this single logic value, and the UART coupled to the receiver of the bus slave remains in the idle state. Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A bidirectional bus system, comprising:
   a bus master having a first transmitter configured to couple to a bidirectional bus, the first transmitter operable to transmit a signal in a first voltage range onto the bidirectional bus, the bus master having a first receiver configured to couple to the bidirectional bus; and
   a bus slave having a second transmitter configured to couple to the bidirectional bus, the second transmitter operable to transmit a signal in a second voltage range onto the bidirectional bus, the bus slave having a second receiver configured to couple to the bidirectional bus, wherein the first receiver is configured to interpret the signal in the first voltage range as indicative of an idle state while the second receiver interprets the signal in the first voltage range as communicative of data, and wherein the second receiver is configured to interpret the signal in the second voltage range as indicative of the idle state while the first receiver interprets the signal in the second voltage range as communicative of data, wherein the first voltage range includes a first voltage sub range and a second voltage sub range, the second voltage range includes the second voltage sub range and a third voltage sub range, the first voltage sub range is at a greater voltage than the second voltage sub range, the second voltage sub range is at a greater voltage than the third voltage sub range, the first voltage sub range is separated from the second voltage sub range by a first guard band, and the second voltage sub range is separated from the third voltage sub range by a second guard band.

2. The bidirectional bus system of claim 1, wherein:
   the bus master is operable to broadcast a first message onto the bidirectional bus with the signa in the first voltage range;
   the second receiver of the bus slave receives the message and the first receiver of the bus master ignores the first message;
   the bus slave is operable to send a second message onto the bidirectional bus with the signal in the second range; and
   the first receiver of the bus master receives the second message and the second receiver of the bus slave ignores the second message.

3. The bidirectional bus system of claim 1, wherein:
   the first receiver is configured to interpret the first voltage sub range as a logical one and the second receiver is configured to interpret as a logical zero;
   the first voltage range and the second voltage range overlap;
   the overlap of the first voltage range and the second voltage range includes the second voltage sub range that the first receiver is configured to interpret as a logical one and the second receiver is configured to interpret as a logical one; and
   the second voltage range includes the third voltage sub range that the first receiver is configured to interpret as a logical zero and the second receiver is configured to interpret as a logical one.

4. The bidirectional bus system of claim 1, further comprising:
   a biasing circuit configured to couple to the bidirectional bus and to establish a differential voltage on the bidirectional bus.

5. The bidirectional bus system of claim 1, further comprising:
   the second transmitter having an isolation circuit that accepts coupling to a device having an operating voltage that differs from voltages of the bidirectional bus.

6. The bidirectional bus system of claim 1, further comprising:
   the second receiver having an isolation circuit that accepts coupling to a device having an operating voltage that differs from voltages of the bidirectional bus.

7. A bidirectional bus system, comprising:
   a bus master having a first differential output circuit configured to couple to a bidirectional bus and to express differential voltages in a first voltage range on the bidirectional bus during master transmission, the bus master having a first differential input amplifier configured to couple to the bidirectional bus, the first differential input amplifier being configured to receive the differential voltages in the first voltage range as showing , the first differential input amplifier being configured to receive differential voltages in a second voltage range as showing an active communication that includes two logic values; and
   a bus slave having a second differential output circuit configured to couple to the bidirectional bus and to express the differential voltages in the second voltage range on the bidirectional bus during slave transmission, the bus slave having a second differential input amplifier configured to couple to the bidirectional bus, the second differential input amplifier being configured to receive the differential voltages in the first voltage range as showing a further active communication that includes the two logic values, the second differential amplifier being configured to receive the differential voltages in the second voltage range as showing the single logic value.

8. The bidirectional bus system of claim 7, further comprising:
   a resistor ladder configured to bias the bidirectional bus to a differential voltage value contained in an overlap of the first voltage range and the second voltage range, the resistor ladder being further configured to terminate the bidirectional bus.

9. The bidirectional bus system of claim 7, wherein:
   the first differential output circuit includes a buffer coupled to a first switch and coupled to a second switch;

the first switch is configured to couple to a first wire of the bidirectional bus and couple to a positive power supply voltage;

the second switch is configured to couple to a second wire of the bidirectional bus and couple to an electrical ground; and the first and second switches are configured to be closed when the bus master expresses a differential voltage in a first voltage sub range and open when the bus master expresses a differential voltage in a second voltage sub range, wherein the first voltage range includes the first voltage sub range and the second voltage sub range.

10. The bidirectional bus system of claim 7, wherein:

the second differential output circuit includes an optoisolator having an output configured to couple to the bidirectional bus; and the optoisolator is configured to present a first impedance to the bidirectional bus when the bus slave expresses a differential voltage in a second voltage sub range and present a second impedance to the bidirectional bus when the bus slave expresses a differential voltage in a third voltage sub range, wherein the second voltage range includes the second voltage sub range and the third voltage sub range.

11. The bidirectional bus system of claim 7, wherein the second differential input amplifier includes an optoisolator having an input configured to couple to the bidirectional bus.

12. The bidirectional bus system of claim 11, further comprising:

a diode coupled to one input of the optoisolator.

13. The bidirectional bus system of claim 8, further comprising:

a first UART (universal asynchronous receiver and transmitter) coupled to the bus master; and a second UART coupled to the bus slave;

wherein the single logic value is compatible with an idle state of the first UART and an idle state of the second UART.

14. A method of operating a bidirectional bus, comprising:

transmitting onto a bidirectional bus a first sequence of voltages that includes a voltage in a first voltage range and a voltage in a second voltage range;

interpreting the first sequence of voltages, at a first location, as associated with an idle state;

interpreting the first sequence of voltages, at a second location, as a first active communication having application of two logic values;

transmitting onto the bidirectional bus a second sequence of voltages that includes a further voltage in the second voltage range and a voltage in a third voltage range;

interpreting the second sequence of voltages, at the first location, as a second active communication having application of the two logic values; and interpreting the second sequence of voltages, at the second location, as the single logic value associated with the idle state.

15. The method of claim 14, wherein:

the first sequence of voltages is transmitted by a bus master;

the voltage in the first voltage range in the first sequence of voltages is interpreted by a first receiver of the bus master, at the first location, as a logical one;

the voltage in the second voltage range in the first sequence of voltages is interpreted by the first receiver of the bus master, at the first location, as a logical one;

the voltage in the first voltage range in the first sequence of voltages is interpreted by a second receiver of a bus slave, at the second location, as a logical zero;

the voltage in the second voltage range in the first sequence of voltages is interpreted by the second receiver of the bus slave, at the second location, as a logical zero;

the further voltage in the second voltage range in the second sequence of voltages is interpreted by the first receiver of the bus master, at the first location, as a logical one;

the voltage in the third voltage range in the second sequence of voltages is interpreted by the first receiver of the bus master, at the first location, as a logical zero;

the further voltage in the second voltage range in the second sequence of voltages is interpreted by the second receiver of the bus slave, at the second location, as a logical one; and the voltage in the third voltage range in the second sequence of voltages is interpreted by the second receiver of the bus slave, at the second location, as a logical one.

16. The method of claim 14, further comprising:

arranging a first guard band between the second voltage range and the first voltage range; and arranging a second guard band between the second voltage range and the third voltage range.

17. The method of claim 14, further comprising:

isolating a transmitter connection of a bus slave from the bidirectional bus so that the transmitter connection and the bidirectional bus are operable to have independent operating voltages.

18. The method of claim 14, further comprising:

isolating a receiver connection of a bus slave from the bidirectional bus so that the receiver connection and the bidirectional bus are operable to have independent operating voltages.

19. The method of claim 14, wherein:

transmitting the voltage in the first voltage range in the first sequence of voltages onto the bidirectional bus includes closing a first switch that couples a first wire of the bidirectional bus to a positive power supply voltage and closing a second switch that couples a second wire of the bidirectional bus to a ground connection;

transmitting the voltage in the second voltage range in the first sequence of voltages onto the bidirectional bus includes opening the first switch and opening the second switch;

transmitting the voltage in the second voltage range in the second sequence of voltages onto the bidirectional bus includes maintaining an impedance that couples the first wire and the second wire; and transmitting the voltage in the third voltage range in the second sequence of voltages onto the bidirectional bus includes reducing the impedance that couples the first wire and the second wire.

\* \* \* \* \*